US010132999B2

(12) United States Patent
Barwicz et al.

(10) Patent No.: US 10,132,999 B2
(45) Date of Patent: *Nov. 20, 2018

(54) SACRIFICIAL GRATING COUPLER FOR TESTING V-GROOVED INTEGRATED CIRCUITS (71) Applicant: International Business Machines Corporation, Armonk, NY (US)

(72) Inventors: Tymon Barwicz, Yorktown Heights, NY (US); William M. J. Green, Irvington, NY (US); Jens Hofrichter, Gattikon (CH); Marwan H. Khater, Astoria, NY (US); Jessie C. Rosenberg, Mount Vernon, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 15/198,053

(22) Filed: Jun. 30, 2016

(65) Prior Publication Data
US 2018/0003896 A1 Jan. 4, 2018

(51) Int. Cl.
*G02B 6/136* (2006.01)
*G02B 6/34* (2006.01)
*G02B 6/30* (2006.01)

(52) U.S. Cl.
CPC ............. *G02B 6/136* (2013.01); *G02B 6/305* (2013.01); *G02B 6/34* (2013.01)

(58) Field of Classification Search
None
See application file for complete search history.

(56) References Cited

U.S. PATENT DOCUMENTS

| 5,557,695 A * | 9/1996 | Yamane | G02B 6/30 |
| | | | 385/147 |
| 5,629,998 A | 5/1997 | Cook et al. | |
| 5,787,214 A | 7/1998 | Harpin et al. | |
| 6,822,260 B1 | 11/2004 | Nariman et al. | |
| 7,024,066 B1 | 4/2006 | Malendevich et al. | |
| 7,109,739 B2 | 9/2006 | Gothoskar et al. | |
| 7,184,626 B1 | 2/2007 | Gunn, III et al. | |
| 7,378,861 B1 | 5/2008 | Malendevich et al. | |
| 8,724,100 B1 | 5/2014 | Asghari et al. | |

(Continued)

OTHER PUBLICATIONS

List of IBM Patents or Patent Applications Treated as Related; Date File: Jun. 30, 2016, p. 1-2.

(Continued)

*Primary Examiner* — Chad H Smith
(74) *Attorney, Agent, or Firm* — Cantor Colburn LLP; Vazken Alexanian (57) ABSTRACT

Embodiments are directed to a method of forming an optical coupler system. The method includes forming at least one waveguide over a substrate, and forming a sacrificial optical coupler in a first region over the substrate. The method further includes configuring the sacrificial optical coupler to couple optical signals to or from the at least one waveguide, and forming a v-groove in the first region over the substrate, wherein forming the v-groove includes removing the sacrificial optical coupler from the first region.

20 Claims, 11 Drawing Sheets

(56) References Cited

U.S. PATENT DOCUMENTS 8,823,406 B2 9/2014 Bolt et al.
2009/0290837 A1 11/2009 Chen et al.

OTHER PUBLICATIONS

Roelkens et al., "High efficiency Silicon-on-Insulator grating coupler based on a poly-Silicon overlay." Nov. 27, 2006 / vol. 14, No. 24 / Optics Express. (9 pgs).
Tymon Barwicz, et al.,"Sacrificial Coupler for Testing V-Grooved Integrated Circuits", U.S. Appl. No. 15/198,061, filed Jun. 30, 2016.
Barwicz et al., "Sacrificial Grating Coupler for Testing V-Grooved Integrated Circuits," U.S. Appl. No. 15/992,381, filed May 30, 2018.
List of IBM Patents or Patent Applications Treated as Related; Date Filed: Jun. 30, 2016, 2 pages.

* cited by examiner

POLYSILICON GRATING

FIG. 3A

SILICON NITRIDE GRATING

SACRIFICIAL GRATING COUPLER FOR TESTING V-GROOVED INTEGRATED CIRCUITS

BACKGROUND

The present invention relates in general to the testing of optoelectronic components in integrated circuits (ICs) that utilize v-grooves to couple input/output (IO) photonic signals between optical fibers and the IC. More specifically, the present invention relates to fabrication methodologies and resulting structures that allow the efficient and cost-effective testing of optoelectronic components in ICs prior to v-groove formation and coupling.

Semiconductor devices are used in many electronic and other applications. ICs are typically formed from various circuit configurations of semiconductor devices formed on semiconductor wafers. Alternatively, semiconductor devices can be formed as monolithic devices, e.g., discrete devices. Semiconductor devices are formed on semiconductor wafers by depositing many types of thin films of material over the semiconductor wafers, patterning the thin films of material, doping selective regions of the semiconductor wafers, etc. In a conventional semiconductor fabrication process, a large number of semiconductor devices are fabricated in a single wafer. After completion of device level and interconnect level fabrication processes, the semiconductor devices on the wafer are separated and the final products is packaged. CMOS (complementary metal-oxide semiconductor) is the semiconductor fabrication technology used in the transistors that are manufactured into most of today's computer microchips. In CMOS technology, both n-type and p-type transistors are used in a complementary way to form a current gate that forms an effective means of electrical control. Processing steps performed later in CMOS technology are referred to as back-end-of-line (BEOL) CMOS processing, and processing steps performed earlier in CMOS technology are referred to as front-end-of-line (FEOL) CMOS processing.

Interconnect bottlenecks are mitigated, and in many cases overcome, by replacing selected IO electrical signals and metallic connections on ICs with optical signals and optical couplers. The optical IO signals, once coupled from optical fibers to the IC, are routed to target downstream optoelectronic components, as well as output optical fibers. ICs often use v-grooves for edge-coupling to optical fibers in the final packaged product. However, the optical access required for testing ICs that use v-groove coupling is only available after v-groove etching, dicing and packaging, which are expensive and time-consuming BEOL processes. Accordingly, the testing of v-groove coupled ICs is often performed on separate test ICs having inputs and outputs connected using optical couplers that do not require expensive and time-consuming fabrication. Such testing approaches and configurations provide some information but do not allow testing of the actual IC product.

It is therefore desirable to test the performance of actual v-groove coupled IC products at the wafer-level before v-groove etching, dicing and packaging in order to acquire statistical yield and performance data and package only known-good dies.

SUMMARY

Embodiments are directed to a method of forming an optical coupler system. The method includes forming at least one waveguide over a substrate, and forming a sacrificial optical coupler in a first region over the substrate. The method further includes configuring the sacrificial optical coupler to couple optical signals to or from the at least one waveguide, and forming a v-groove in the first region over the substrate, wherein forming the v-groove includes removing the sacrificial optical coupler from the first region.

Embodiments are further directed to a method of forming an optical coupler system. The method includes forming at least one waveguide over a substrate, and forming a sacrificial optical coupler in a first region over the substrate. The method further includes configuring the sacrificial optical coupler to couple optical signals to or from the at least one waveguide, and performing a test operation comprising coupling optical signals through the sacrificial optical coupler to or from the at least one waveguide. The method further includes forming a v-groove in the first region over the substrate, wherein forming the v-groove includes removing the sacrificial optical coupler from the first region.

Embodiments are further directed to a method of forming an optical coupler system. The method includes forming at least one waveguide over a substrate, and forming a sacrificial optical coupler in a first region over the substrate. The method further includes configuring the sacrificial optical coupler to couple optical signals to or from the at least one waveguide, and performing a test operation comprising coupling optical signals through the sacrificial optical coupler to or from the at least one waveguide. The method further includes, subsequent to performing the test operation, forming a v-groove in the first region over the substrate, wherein forming the v-groove includes removing the sacrificial optical coupler from the first region.

Embodiments are further directed to an optical coupler system having at least one waveguide formed over a substrate, and a sacrificial optical coupler formed in a first region over the substrate, wherein the sacrificial optical coupler is configured to couple optical signals to or from the at least one waveguide, and wherein the first region defines an area in which a v-groove will be formed during a subsequent fabrication operation of the optical coupler system.

Embodiments are further directed to an optical coupler system having at least one waveguide formed over a substrate, and sacrificial gratings formed in a first region over the substrate, wherein the sacrificial gratings are configured to couple optical signals to or from the at least one waveguide, wherein the first region defines an area in which a v-groove will be formed during a subsequent fabrication operation of the optical coupler system, and wherein removing the subsequent fabrication operation comprises one or more etch operations.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

In the accompanying figures and following detailed description of the described embodiments, the various elements illustrated in the figures are provided with three or four digit reference numbers.

DETAILED DESCRIPTION

It is understood in advance that, although this description includes a detailed description of a sacrificial grating coupler, implementation of the teachings recited herein are not limited to a particular type of sacrificial optical coupler or transmission architecture. Rather embodiments of the present invention are capable of being implemented in conjunction with any other type of sacrificial optical coupler or transmission architecture, now known or later developed, as long as the sacrificial optical coupler can be at least substantially removed from the v-groove region by the v-groove formation process.

Various embodiments of the present invention will now be described with reference to the related drawings. Alternative embodiments can be devised without departing from the scope of this invention. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The term "exemplary" is used herein to mean "serving as an example, instance, or illustration." Any embodiment or design described herein as "exemplary" is not necessarily to be construed as preferred or advantageous over other embodiments or designs. The terms "at least one" and "one or more" can be understood to include any integer number greater than or equal to one, i.e. one, two, three, four, etc. The terms "a plurality" can be understood to include any integer number greater than or equal to two, i.e. two, three, four, five, etc. The term "connection" can include both an indirect "connection" and a direct "connection." The term "optoelectronic" is used herein to capture the property of receiving, processing, transporting and/or transmitting signals in the form of photonic energy.

As previously noted herein, interconnect bottlenecks are mitigated, and in many cases overcome, by replacing selected IO electrical signals and metallic connections on ICs with optical signals and optical couplers. The optical IO signals, once coupled from optical fibers to the IC, are routed to target downstream optoelectronic components, as well as output optical fibers. Silicon photonic chips often use v-grooves for edge-coupling and packaging to optical fibers. However, v-grooves only provide optical access to the IC chip after v-groove etching, dicing and packaging, which are expensive and time-consuming processes. For example, in order to fully test the active chip region of a silicon photonic chip, the optoelectronic components of the active chip region must be connected together off-chip via fiber, or else they must be tested separately. Currently, wafer-level testing can only be performed on separate test chips, wherein the test chip inputs and outputs are connected to vertical grating couplers. Accordingly, for photonic ICs that rely on v-groove coupling, known wafer-level testing methodologies do not allow testing of the actual product chip prior to v-groove formation in the final fabrication and packaging stages.

It is therefore desirable to test the performance of optoelectronic components of an active chip region on the wafer-level before v-groove etching, dicing and packaging in order to acquire statistical yield and performance data and package only known-good dies.

Turning now to an overview of the present invention, one or more embodiments allow the testing of optoelectronic components in ICs that utilize v-grooves to couple IO photonic signals between optical fibers and the IC. More specifically, one or more embodiments of the present invention provide fabrication methodologies and resulting structures that allow the efficient and cost-effective testing of optoelectronic components in the active chip regions of ICs prior to v-groove formation and coupling. In one or more embodiments, sacrificial optical couplers (e.g., sacrificial grating couplers) are placed, prior to actual v-groove formation, in the v-groove regions (i.e., the regions where the v-groove will be formed) to connect multiple on-chip components.

Known approaches to forming temporary on-chip connection to an active chip region for wafer-scale testing create additional insertion loss and power consumption through the use of taps and/or optical switches to couple the temporary connection into the same waveguide output as the v-groove that will be formed in the final packaging steps. In contrast to such known approaches, in one or more embodiments the sacrificial optical coupler couples the same optical signals into the IC that will be provided by the v-groove coupler, which allows full testing of the product prior to the completion of final packaging processes. However, because the sacrificial optical coupler is formed prior to v-groove formation and coupling, the full functionality of the actual to-be-packaged IC can be tested prior to v-groove etching, dicing and packaging, which are expensive and time-consuming processes. Additionally, because the sacrificial optical coupler is located over the region in which the v-groove will be formed, the sacrificial optical coupler is completely removed during v-groove etching, dicing and packaging. Thus, the presence of the sacrificial optical coupler for inline wafer-scale testing does not negatively impact the final product performance, and the exact product chip can be fully tested prior to final assembly.

In contrast to known IC inline testing techniques that rely on taps or switching elements to route or split optical signals for testing, the described sacrificial optical coupler avoids the excess optical insertion loss and power consumption of taps and switches. There are two primary aspects of the optical insertion loss. First, excess loss from the structures can deteriorate the product device permanently even after the taps and switches are no longer in use. Second, only a small amount of power can often be coupled to the device under test. However, by utilizing a sacrificial coupler in accordance with the present teachings, the device receives substantially the same amount of light that will be incident on the IC optical path in the final packaged product, thereby coupling, during testing, the same (or greater) power levels as would be present during operation.

Figure 1:
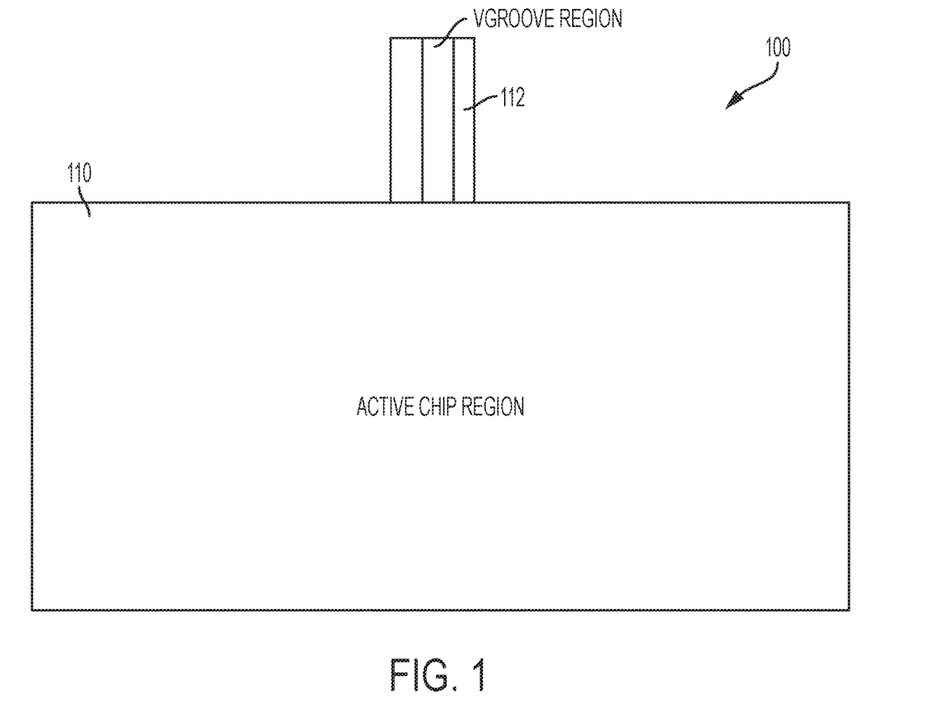
FIG. 1 depicts a top-down view of an optical coupler and testing system after an initial fabrication stage according to one or more embodiments.

Turning now to a more detailed description of the present invention, FIG. 1 depicts a top-down view of an optical coupler and testing system 100 after an initial fabrication stage but before final v-groove formation and coupling according to one or more embodiments. Although the embodiment shown in FIG. 1 focuses on a sacrificial grating coupler, implementation of the teachings recited herein are not limited to a particular type of sacrificial optical coupler or transmission architecture. Rather embodiments of the present invention are capable of being implemented in conjunction with any other type of sacrificial optical coupler or transmission architecture, now known or later developed, as long as the sacrificial optical coupler can be at least substantially removed from the v-groove region by the v-groove formation process.

In various semiconductor manufacturing processes, the semiconductor wafers that are produced can be separated to produce individual IC chips each having at least one active chip region 110. Active chip region 110 includes the optoelectronic components and signal pathways/connections of the IC chip. As shown in FIG. 1, system 100 includes active chip region 110 and a v-groove region 112. At this stage of fabrication, complete components have been fabricated in active chip region 110 but a v-groove has not yet been formed. The regions in which v-grooves will be formed in the final fabrication and packaging stages are shown as v-groove region 112. Although one v-groove is shown in FIG. 1, it is understood that multiple v-groove regions can be provided on the chip.

Figure 2:
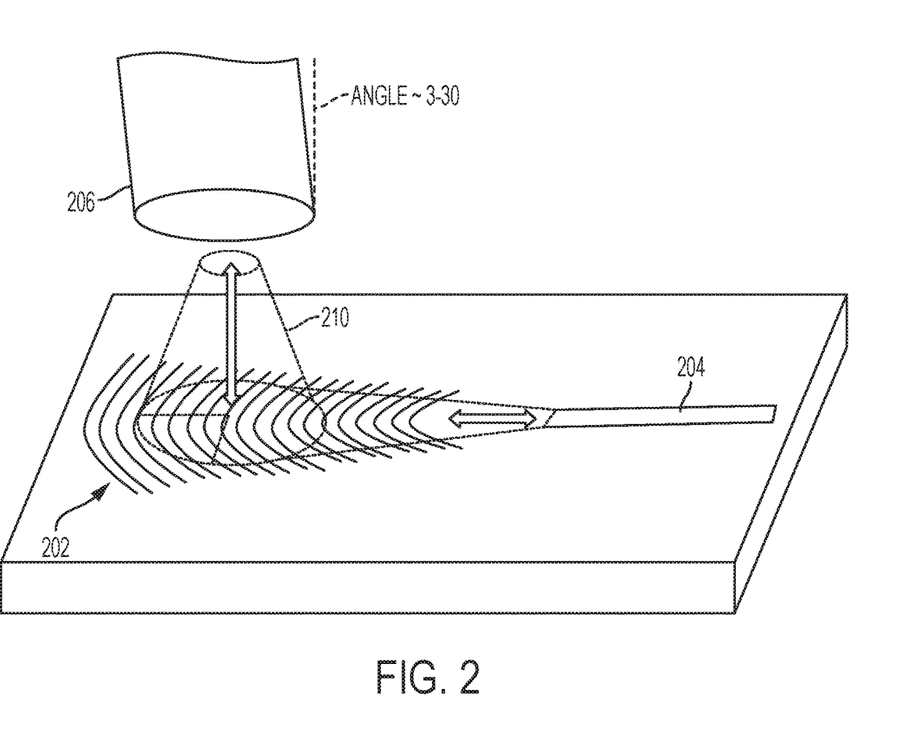
FIG. 2 depicts a three-dimensional view of an optical grating coupler, which can be utilized as a sacrificial optical coupler according to one or more embodiments.
Figure 3A:
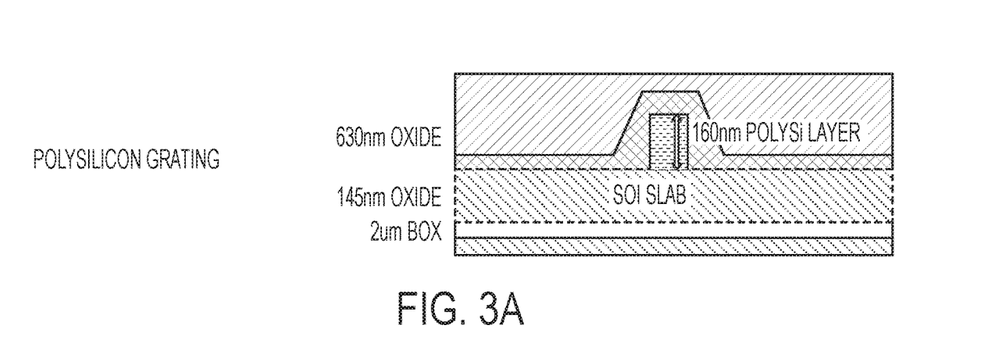
FIG. 3A depicts a cross-sectional view of a grating according to one or more embodiments.
Figure 3B:
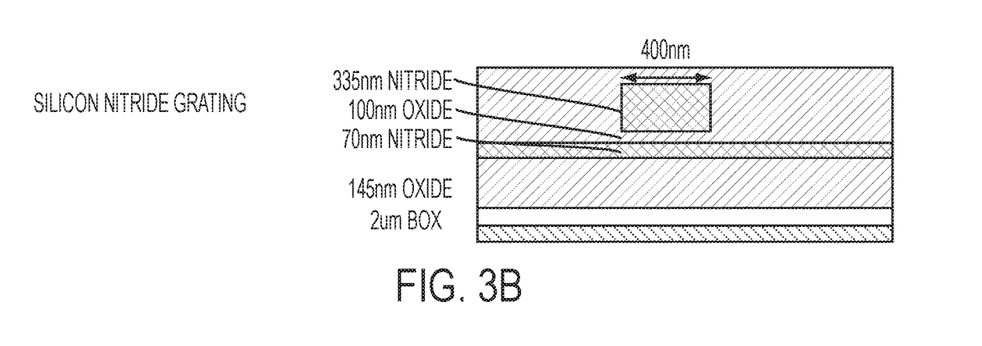
FIG. 3B depicts a cross-sectional view of a grating according to one or more embodiments.
Figure 3C:
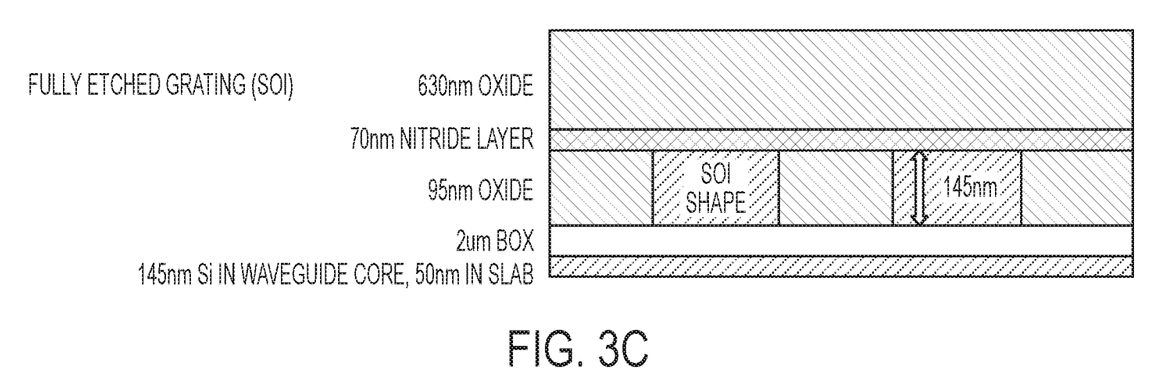
FIG. 3C depicts a cross-sectional view of a grating according to one or more embodiments.
Figure 3D:
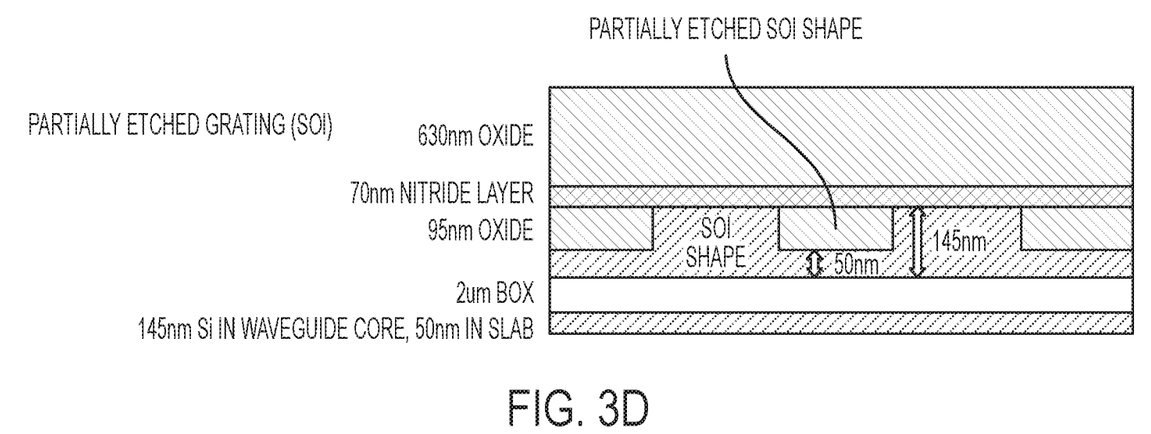
FIG. 3D depicts a cross-sectional view of a grating according to one or more embodiments.

In order to test system 100 prior to final v-groove formation, sacrificial optical couplers are formed in v-groove region 112 in accordance with one or more embodiments of the present invention. FIG. 2 depicts an exemplary optical grating coupler 202 that feeds to an exemplary waveguide coupler 204. Optical grating coupler 202 can be utilized as a sacrificial optical coupler in system 100 according to one or more embodiments. In general, grating couplers can be used to couple optical signals from an optical fiber 206 to waveguide 204, or from waveguide 204 to optical fiber 206. Grating coupler 202 bridges the large mismatch in optical spot size between optical fiber 206 and waveguide 204. Grating couplers are a more flexible approach than edge coupling in that grating couplers allow coupling anywhere on a chip, and no post-processing is needed for coupling, which facilitates wafer-scale testing prior to packaging. On the other hand, grating couplers have limited optical bandwidth and larger polarization penalty than in-plane couplers so V-grooves and in-plane coupler are still preferred for the product device packaging. Any type of grating is suitable as long as the gratings provide a designed periodic variation of the refractive index on-chip as known to people of skill in the art. Suitable types of vertical grating couplers are shown in FIGS. 3A, 3B, 3C and 3D, which include fully etched silicon grating formed in the SOI (silicon-on-insulator) layer grating (shown in FIG. 3C), partially etched silicon grating formed in the SOI layer (shown in FIG. 3D), fully etched poly-silicon grating formed in the CMOS poly-silicon gate layer (shown in FIG. 3A), fully etched silicon nitride grating (shown in FIG. 3B), and the like.

Waveguide 204 acts as "light pipe" that confines and guides light in the plane of the wafer. In general, optical waveguides are dielectric structures that transmit various forms of radiation or electromagnetic waves in a direction that is parallel (i.e., transverse) to the waveguide's propagation axis. Optical waveguides are fundamental building blocks of many optical systems, including fiber-optic communications links, fiber lasers and amplifiers for high-power applications, as well as all-optical photonic ICs. Optical waveguides can be classified according to their geometry (e.g., planar, slab/strip, fiber waveguides, etc.), mode structure (e.g., single-mode, multi-mode, etc.), refractive index distribution (e.g., step, gradient, etc.), guiding mechanism (e.g., total internal reflection, anti-guiding, photonic bandgap, etc.) and waveguide material (e.g., glass, polymer, semiconductor, etc.).

Because multi-mode optical waveguides support the transmission of multiple distinct signals, their transverse dimension can be large, which makes them well suited for short distance optical applications. Thus, multi-mode optical waveguides are suited for implementing short distance optical coupling. However, it is difficult to perform higher level optical signal processing (e.g., wavelength division multiplexing) using multi-mode optical signals. Further, their large transverse dimension makes it difficult to interface multi-mode optical waveguides to the single-mode optical fibers that are typically used to communicate over longer distances. Accordingly, single-mode optical waveguides are better suited for longer distance coupling because they interface effectively with single-mode, long distance optical fibers. Additionally, single-mode optical waveguides are compatible with the performance of higher level optical signal processing.

Figure 4:
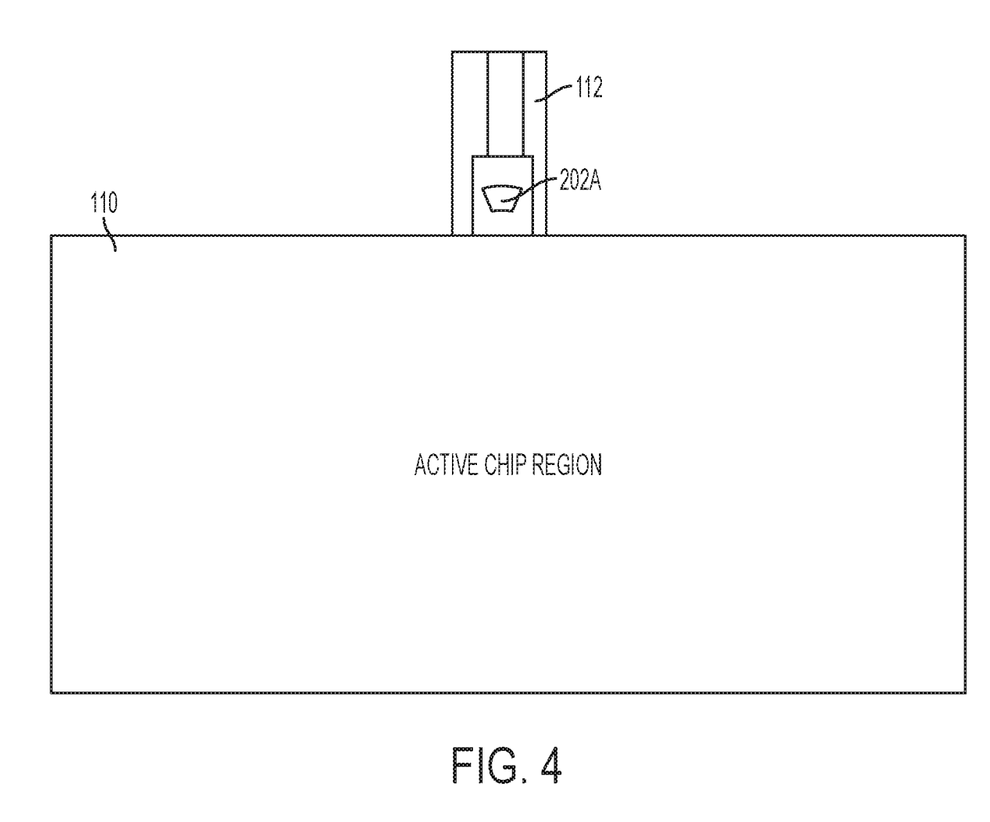
FIG. 4 depicts a top-down view of an optical coupler and testing system after sacrificial optical coupler formation according to one or more embodiments.

FIG. 4 depicts optical coupler and testing system 100 after formation of a sacrificial grating coupler 202A over v-groove region 112 according to one or more embodiments. Additional details of the formation of sacrificial grating coupler 202A over v-groove region 112 are shown in FIGS. 9A, 9B and 9C. Referring now to FIGS. 4 and 9A, sacrificial grating coupler 202A couples light from a light source such as a laser (not shown) through a mode converter 902 (which can be a waveguide) into active region 110. Sacrificial grating couplers 202, 202A can be formed using conventional vertical grating fabrication techniques known in the art. The placement of sacrificial grating coupler 202A, however, is made, in accordance with embodiments of the present invention, over v-groove region 112. In accordance with embodiments of the present invention, sacrificial grating coupler 202A allows optical signals to be coupled into active chip region 110 in substantially the same manner as the v-groove coupling that will be present in the final packaged product.

Because sacrificial grating coupler 202A is formed prior to v-groove formation and coupling, the full functionality of the actual to-be-packaged IC can be tested prior to v-groove etching, dicing and packaging, which are expensive and time-consuming processes. Because sacrificial grating coupler 202A is located over a region (v-groove region 112) in which the v-grooves will be formed, sacrificial grating coupler 202A is completely removed during v-groove etching, dicing and packaging. Thus, the presence of sacrificial grating coupler 202A for inline wafer-scale testing does not negatively impact the final product performance, and the exact product chip can be fully tested prior to final assembly. In contrast to known IC inline testing techniques that rely on taps or switching elements to route or split optical signals for testing, the described sacrificial grating coupler 202A avoids the excess optical insertion loss and power consumption of taps and switches, avoid the permanent performance impact on the final product, and receives substantially the same amount of light as the amount that of light will be incident on the IC optical path in the final packaged product, thereby coupling the same power levels (or greater) during testing that would be present during operation.

Figure 5:
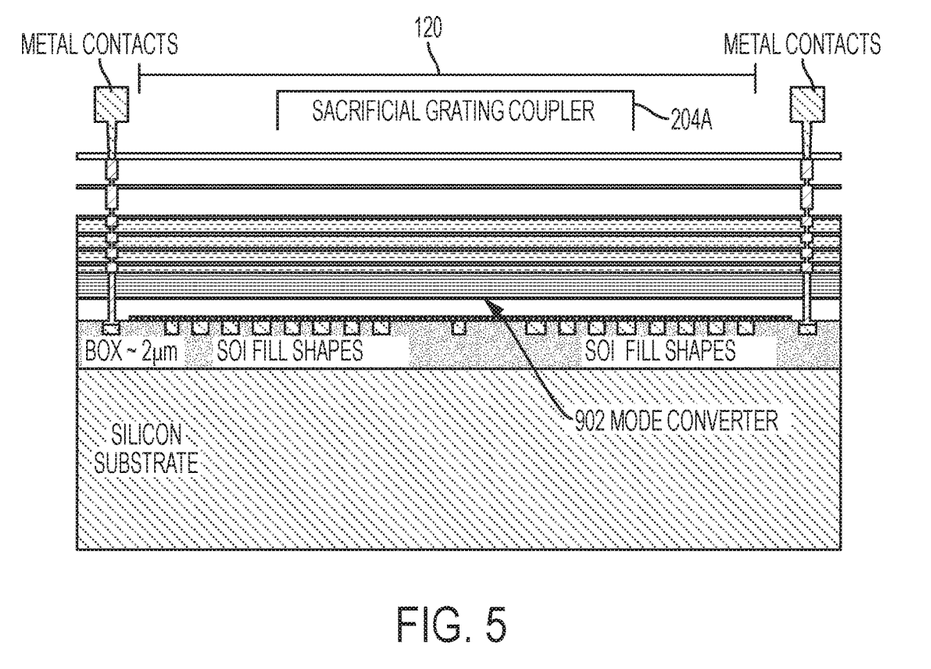
FIG. 5 depicts a cross-sectional view of an optical coupler and testing system prior to v-groove formation according to one or more embodiments.
Figure 6:
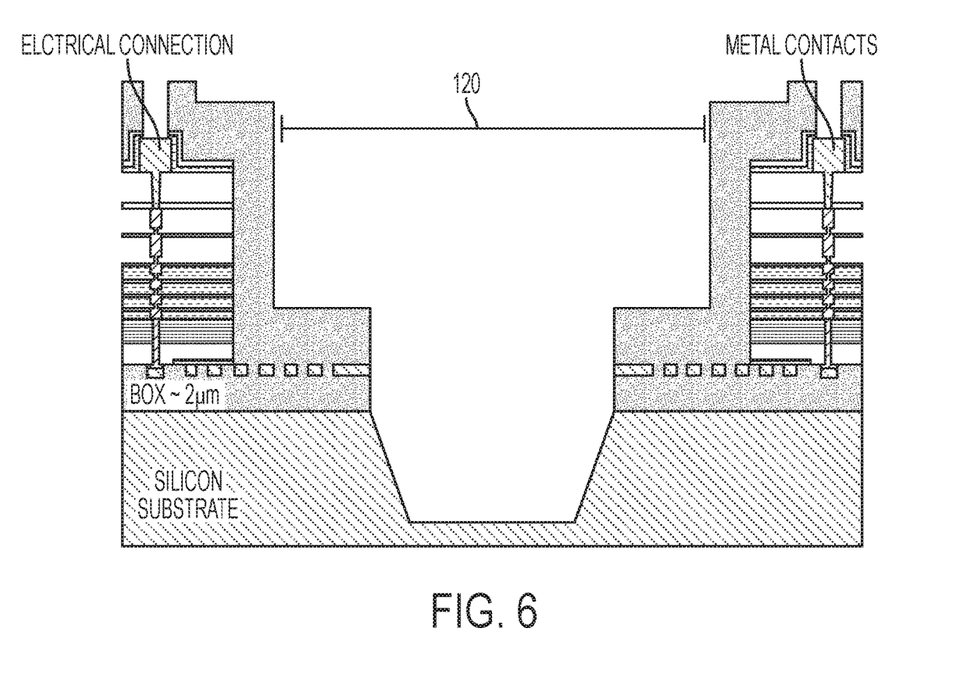
FIG. 6 depicts a cross-sectional view of an optical coupler and testing system after v-groove formation according to one or more embodiments.
Figure 7:
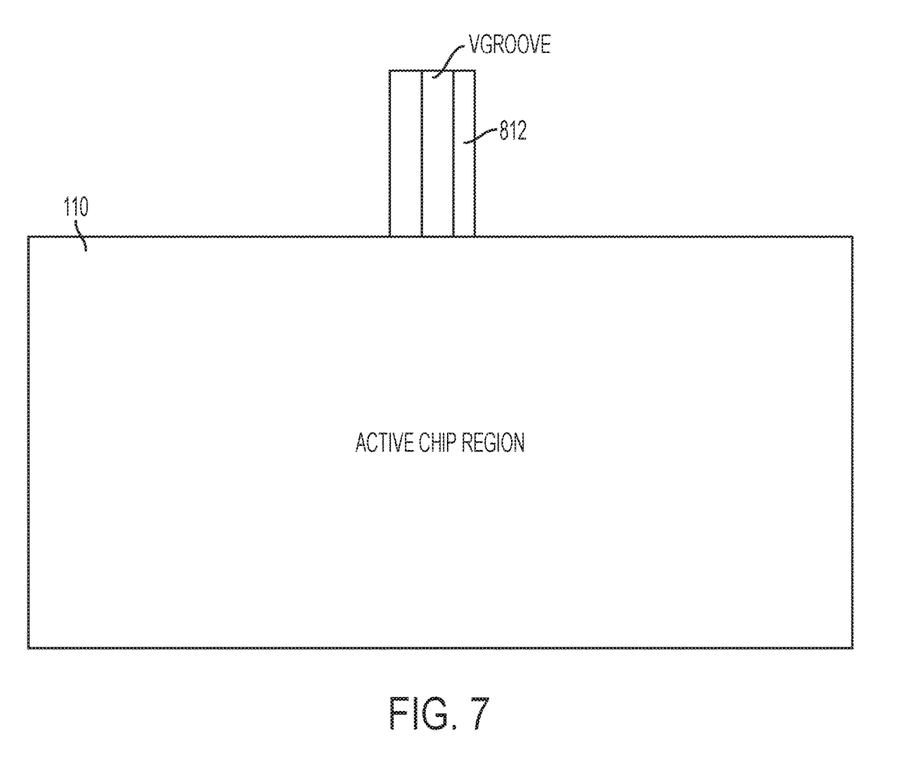
FIG. 7 depicts a top-down view of an optical coupler and testing system after sacrificial optical coupler removal and v-groove formation according to one or more embodiments.

A variety of methodologies for forming v-grooves are capable of being utilized in connection with implementing one or more embodiments of the present invention. FIG. 5 depicts a cross-sectional view of a portion of active chip region 110 prior to v-groove formation, and FIG. 6 depicts a cross-sectional view of the same portion of active chip region 110 after v-groove formation. FIGS. 5 and 6 depict a width dimension 120 of the v-groove region 112 (shown in FIGS. 1 and 7). FIG. 7 depicts an optical coupler and testing system 100B after v-groove formation according to one or more embodiments, wherein sacrificial grating coupler 202A has been removed by the fabrication methodology for forming v-groove 812 in v-groove region 112.

Figure 8A:
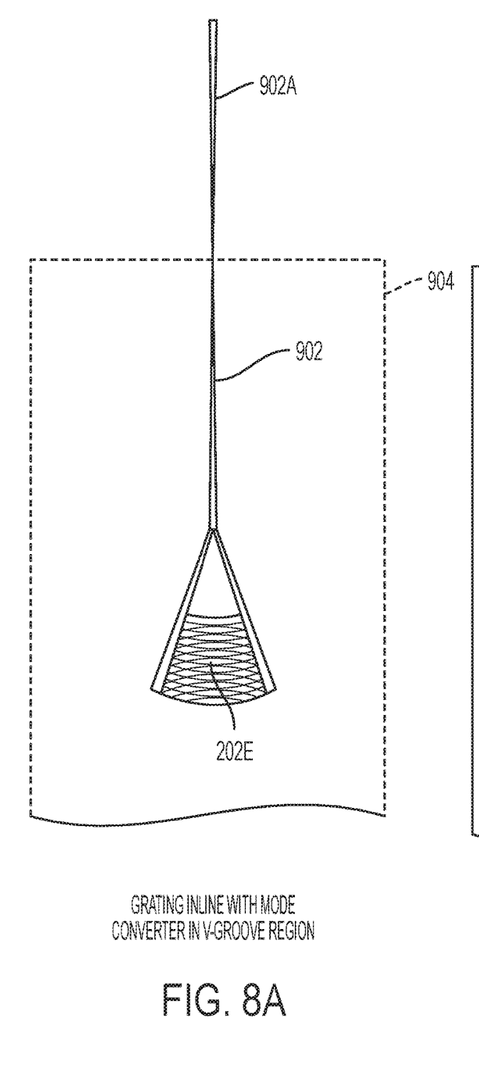
FIG. 8A depicts a top-down view of a sacrificial grating coupler and a mode converter in a v-groove region according to one or more embodiments.
Figure 8B:
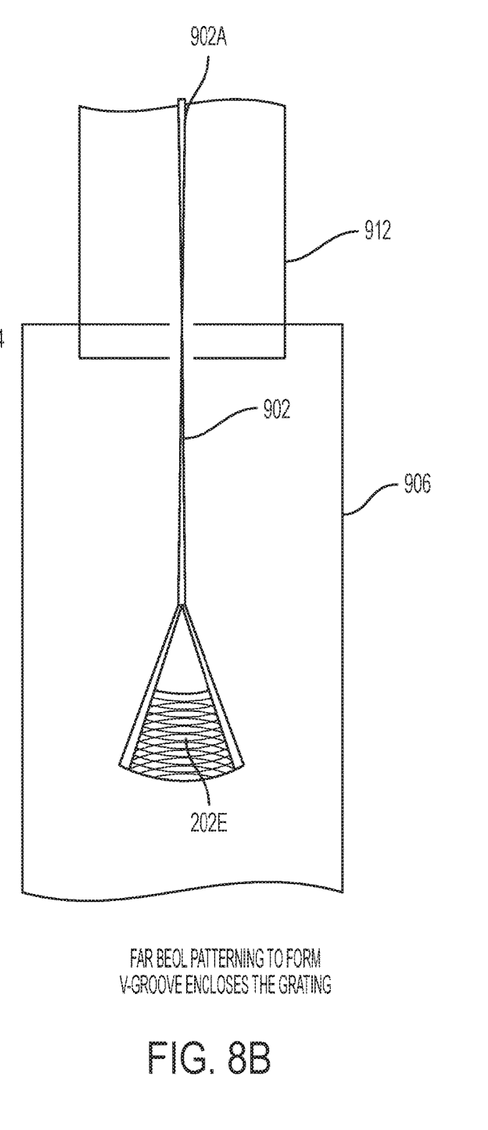
FIG. 8B depicts a top-down view of a sacrificial grating coupler over-laid on patterning to form a v-groove according to one or more embodiments.
Figure 8C:
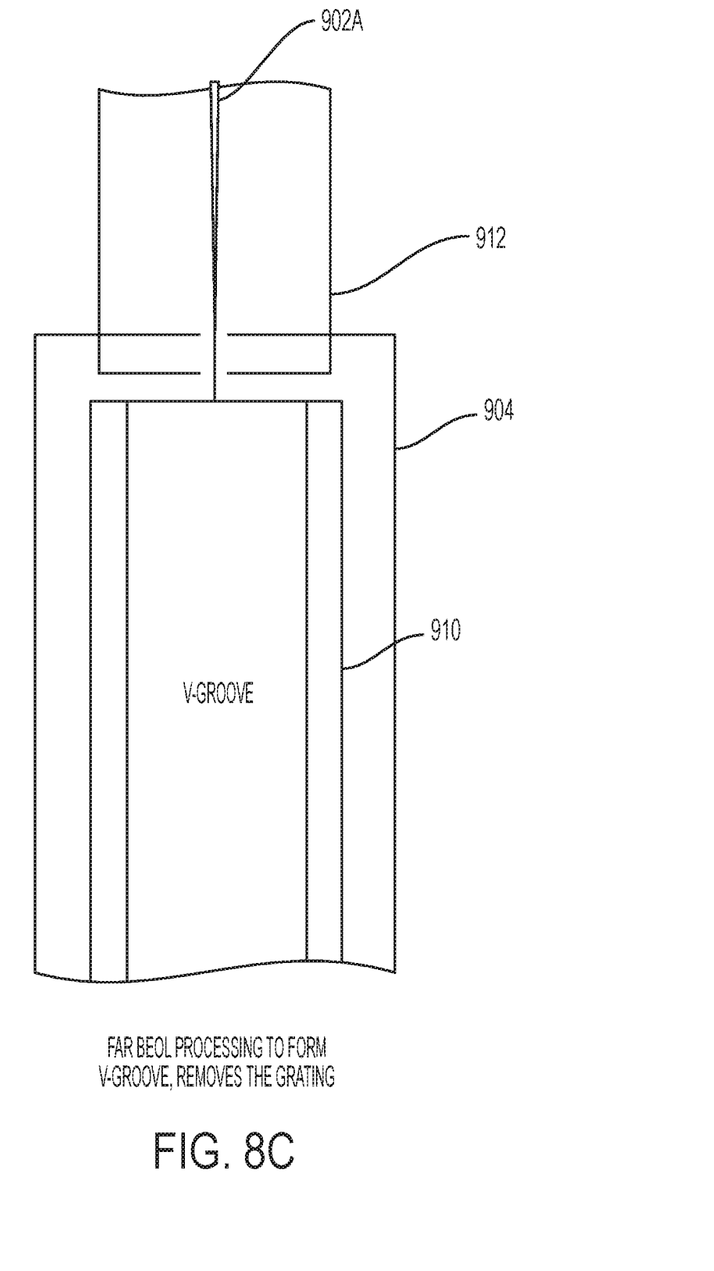
FIG. 8C depicts a top-down view of a v-groove after removal of the sacrificial grating coupler during v-groove formation according to one or more embodiments.

FIG. 8A depicts a top-down view of sacrificial grating coupler 202A and mode converter 902 in a v-groove region 904 according to one or more embodiments. In one or more embodiments, two mode converters 902 and 902A are used. Mode converter 902 is sacrificial and in the v-groove region 904. Mode converter 902A remains to convert the optical mode of a fiber 912 (shown in FIGS. 8B and 8C) that is placed at packaging in the v-groove region 904 to a mode that can be easily routed on chip. The sacrificial mode converter 902 mimics the optical mode that will originate from fiber 912 at the end of the v-groove formation process and thus allows adequate transmission from the sacrificial grating coupler 202E to the device. FIG. 8B depicts a top-down view of an exemplary patterning operation for forming a v-groove with sacrificial grating coupler 202A superimposed over a v-groove pattern 906. FIG. 8C depicts a top-down view of a v-groove 910 after removal of sacrificial grating coupler 202E and after formation of v-groove 910.

Figure 9:
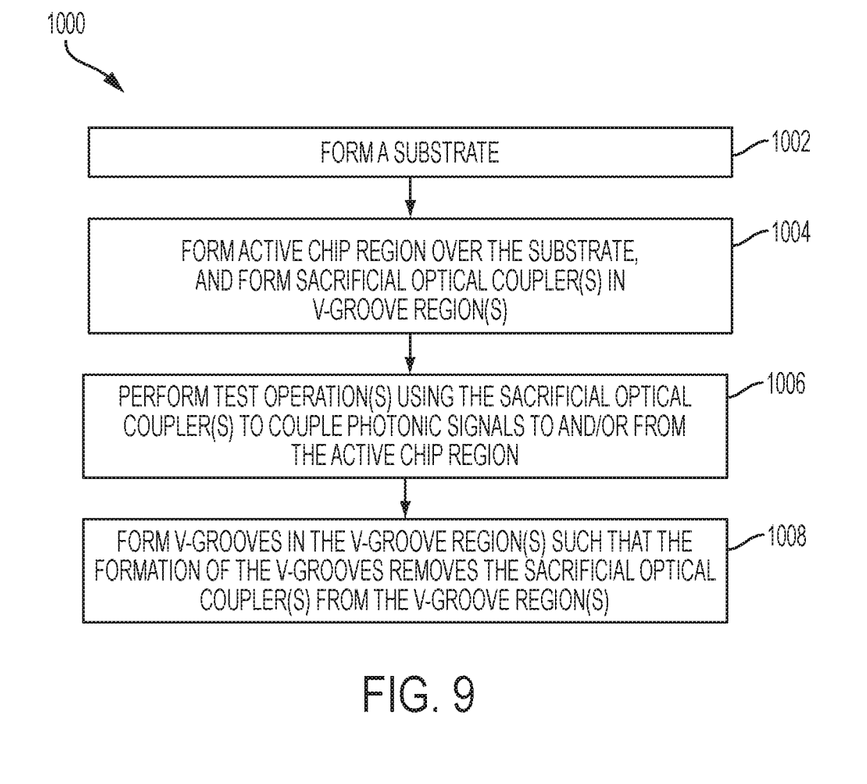
FIG. 9 depicts a flow diagram illustrating a methodology according to one or more embodiments.

FIG. 9 depicts a flow diagram of a methodology 1000 according to one or more embodiments. Methodology 1000 begins at block 1002, wherein a substrate is formed. In block 1004, an active chip region 110 is formed over the substrate, and a sacrificial optical coupler (sacrificial optical grating coupler 202A) is formed in an identified v-groove region. The operations described in block 1004 can be performed concurrently or consecutively In block 1006, test operations are performed using the sacrificial optical coupler to couple photonic signals to and/or from active chip region 110. In block 1008, v-groove 812 is formed in v-groove region 112 such that the formation of v-groove 812 removes sacrificial optical coupler 202A from v-groove region 112.

Thus it can be seen from the foregoing detailed description and accompanying illustrations that embodiments of the present invention allow for the efficient and cost-effective testing of photonic, optoelectronic components in ICs that utilize v-grooves to couple IO photonic signals between optical fibers and the IC. More specifically, embodiments of the present invention provides fabrication methodologies and resulting structures that allow for the efficient and cost-effective testing of photonic, optoelectronic components in ICs prior to v-groove formation and coupling.

As described in detail herein, a sacrificial optical coupler (e.g., a grating coupler) is formed over a region in which a v-groove will be formed. The sacrificial optical coupler couples the same optical signals into the IC that will be provided by the v-groove coupler, which allows full testing of the product prior to the completion of final packaging processes. Because the sacrificial optical coupler is formed prior to v-groove formation and coupling, the full functionality of the actual to-be-packaged IC can be tested prior to v-groove etching, dicing and packaging, which are expensive and time-consuming processes. Because the sacrificial optical coupler is located over the regions in which the v-grooves will be formed, the sacrificial optical coupler is completely removed from the v-groove region during v-groove etching, dicing and packaging. Thus, the presence of the sacrificial optical coupler for inline wafer-scale testing does not negatively impact the final product performance, and the exact product chip can be fully tested prior to final assembly. In contrast to known IC inline testing techniques that rely on taps or switching elements to route or split optical signals, the described sacrificial optical coupler avoids the permanent performance impact on the final product and the excess optical insertion loss and power consumption of taps and switches, and instead receives substantially the same amount of light as the amount that will be incident on the IC optical path in the final packaged product, thereby coupling the same power levels (or greater) during testing that would be present during operation.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The corresponding structures, materials, acts, and equivalents of all means or step plus function elements in the claims below are intended to include any structure, material, or act for performing the function in combination with other claimed elements as specifically claimed. The present invention has been presented for purposes of illustration and description, but is not intended to be exhaustive or limited to the form described. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the functionality and operation of possible implementations of systems and methods according to various embodiments of the present invention. In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. The actions can be performed in a differing order or actions can be added, deleted or modified. Also, the term "coupled" describes having a signal path between two elements and does not imply a direct connection between the elements with no intervening elements/connections therebetween. All of these variations are considered a part of the invention.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present invention has been described in detail in connection with only a limited number of embodiments, it should be readily understood that the present invention is not limited to such described embodiments. Rather, the present invention can be modified to incorporate any number of variations, alterations, substitutions or equivalent arrangements not heretofore described, but which are commensurate with the spirit and scope of the present invention. Additionally, while various embodiments of the present invention have been described, it is to be understood that aspects of the present invention can include only some of the described embodiments. Accordingly, the present invention is not to be seen as limited by the foregoing description, but is only limited by the scope of the appended claims.

What is claimed is:

1. A method of forming an optical coupler system, the method comprising:
    forming at least one waveguide over a substrate;
    forming a sacrificial optical coupler in a first region over the substrate;
    configuring the sacrificial optical coupler to couple optical signals to or from the at least one waveguide; and
    forming a v-groove in the first region over the substrate;
    wherein forming the v-groove includes removing the sacrificial optical coupler from the first region.

2. The method of claim 1 further comprising configuring the sacrificial optical coupler to couple optical signals to or from an optical fiber.

3. The method of claim 1 further comprising performing a test operation comprising coupling optical signals through the sacrificial optical coupler to or from the at least one waveguide.

4. The method of claim 3 further comprising:
    forming at least one optoelectronic component over the substrate; and
    coupling the at least one waveguide to the at least one optoelectronic component;
    wherein performing the test operation further comprises coupling optical signals through the at least one waveguide to or from the at least one optoelectronic component.

5. The method of claim 1, wherein removing the sacrificial optical coupler from the first region comprises one or more etch operations.

6. The method of claim 1 further comprising configuring the v-groove to couple optical signals to or from the at least one waveguide.

7. The method of claim 6 further comprising coupling an optical fiber to the v-groove.

8. The method of claim 7 further comprising configuring the v-groove to couple optical signals to or from the optical fiber.

9. The method of claim 1, wherein the sacrificial optical coupler comprises:
    fully etched silicon gratings formed in a silicon-on-insulator (SOI) layer;
    partially etched gratings formed in the SOI layer;
    fully etched polysilicon gratings formed in a CMOS polysilicon gate layer; or
    fully etched silicon nitride gratings.

10. A method of forming an optical coupler system, the method comprising:
    forming at least one waveguide over a substrate;
    forming a sacrificial optical coupler in a first region over the substrate;
    configuring the sacrificial optical coupler to couple optical signals to or from the at least one waveguide;
    performing a test operation comprising coupling optical signals through the sacrificial optical coupler to or from the at least one waveguide; and
    forming a v-groove in the first region over the substrate;
    wherein forming the v-groove includes removing the sacrificial optical coupler from the first region.

11. The method of claim 10 further comprising:
    forming at least one optoelectronic component over the substrate; and
    coupling the at least one waveguide to the at least one optoelectronic component;
    wherein performing the test operation further comprises coupling optical signals through the at least one waveguide to or from the at least one optoelectronic component.

12. The method of claim 10, wherein removing the sacrificial optical coupler from the first region comprises one or more etch operations.

13. The method of claim 10 further comprising configuring the v-groove to couple optical signals to or from the at least one waveguide.

14. The method of claim 13 further comprising coupling an optical fiber to the v-groove.

15. The method of claim 10, wherein the sacrificial optical coupler comprises a sacrificial grating coupler.

16. A method of forming an optical coupler system, the method comprising:
    forming at least one waveguide over a substrate;
    forming a sacrificial optical coupler in a first region over the substrate;
    configuring the sacrificial optical coupler to couple optical signals to or from the at least one waveguide;

performing a test operation comprising coupling optical signals through the sacrificial optical coupler to or from the at least one waveguide; and subsequent to performing the test operation, forming a v-groove in the first region over the substrate;

wherein forming the v-groove includes removing the sacrificial optical coupler from the first region.

17. The method of claim 16 further comprising:

forming at least one optoelectronic component over the substrate; and coupling the at least one waveguide to the at least one optoelectronic component;

wherein performing the test operation further comprises coupling optical signals through the at least one waveguide to or from the at least one optoelectronic component.

18. The method of claim 16, wherein removing the sacrificial optical coupler from the first region comprises one or more etch operations.

19. The method of claim 16 further comprising:

configuring the v-groove to couple optical signals to or from the at least one waveguide;

coupling an optical fiber to the v-groove; and configuring the v-groove to couple optical signals to or from the optical fiber.

20. The method of claim 16, wherein the sacrificial optical coupler comprises a sacrificial grating coupler.

* * * * *